United States Patent
Hirakura

(10) Patent No.: US 11,467,476 B2
(45) Date of Patent: Oct. 11, 2022

(54) OPTICAL DEVICE, PROJECTOR, AND METHOD FOR CONTROLLING OPTICAL DEVICE

(71) Applicant: SEIKO EPSON CORPORATION, Tokyo (JP)

(72) Inventor: Takao Hirakura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 17/036,953

(22) Filed: Sep. 29, 2020

(65) Prior Publication Data

US 2021/0096449 A1  Apr. 1, 2021

(30) Foreign Application Priority Data

Sep. 30, 2019  (JP) .............................. JP2019-178728

(51) Int. Cl.
| | |
|---|---|
| *G02B 26/08* | (2006.01) |
| *G03B 21/14* | (2006.01) |
| *H01F 7/06* | (2006.01) |
| *H01F 7/02* | (2006.01) |
| *H01F 7/08* | (2006.01) |

(52) U.S. Cl.
CPC ....... *G03B 21/142* (2013.01); *G02B 26/0875* (2013.01); *H01F 7/0205* (2013.01); *H01F 7/064* (2013.01); *H01F 7/081* (2013.01)

(58) Field of Classification Search
CPC .. G03B 21/142; G03B 21/28; G02B 26/0875; H01F 7/0205; H01F 7/064; H01F 7/081; H01F 7/122; H01F 7/14
USPC ...................................................... 359/221.2
See application file for complete search history.

(56) References Cited

U.S. PATENT DOCUMENTS

| | | | | |
|---|---|---|---|---|
| 6,065,231 | A  * | 5/2000 | Suzuki .............. | G11B 19/2009 318/696 |
| 9,664,980 | B2 * | 5/2017 | Mizoguchi .......... | G02B 26/085 |
| 2005/0058439 | A1 * | 3/2005 | Satou ..................... | G11B 7/121 386/E5.064 |
| 2007/0206934 | A1 * | 9/2007 | Ishii ................... | H04N 5/23248 348/E5.046 |
| 2007/0263179 | A1 * | 11/2007 | Katsuragawa ......... | G03B 33/12 353/97 |

(Continued)

FOREIGN PATENT DOCUMENTS

| | | |
|---|---|---|
| CN | 109856898 A | 6/2017 |
| JP | 2011-158589 A | 8/2011 |

(Continued)

*Primary Examiner* — Shawki S Ismail
*Assistant Examiner* — Lisa N Homza
(74) *Attorney, Agent, or Firm* — Dority & Manning, P.A.

(57) ABSTRACT

An optical device includes a movable section including an optical section that deflects video light in accordance with the angle of incidence of the video light incident on a light incident surface and outputs the deflected video light and a holder that supports the optical section, an actuator that rotates the movable section around a first axis, an actuator that rotates the movable section around a second axis, a drive circuit that supplies the actuator with a first drive signal and the actuator with a second drive signal, and a sensor disposed in a position different from the positions on the first and second axes detects the position of the optical section, and the drive circuit adjusts the first and second drive signals in accordance with the position of the optical section detected with the sensor.

12 Claims, 7 Drawing Sheets

(56) References Cited

U.S. PATENT DOCUMENTS

| | | | |
|---|---|---|---|
| 2009/0109530 A1 | 4/2009 | Michimori et al. | |
| 2010/0033587 A1* | 2/2010 | Yumiki | G02B 15/144 |
| | | | 348/341 |
| 2010/0073551 A1* | 3/2010 | Honjo | H04N 5/23209 |
| | | | 348/E5.022 |
| 2010/0208128 A1* | 8/2010 | Yumiki | H04N 5/23245 |
| | | | 348/360 |
| 2014/0253818 A1* | 9/2014 | Ono | G03B 5/06 |
| | | | 348/744 |
| 2015/0036047 A1* | 2/2015 | Bledsoe | H04N 17/002 |
| | | | 348/375 |
| 2015/0237424 A1* | 8/2015 | Wilker | H04R 1/02 |
| | | | 381/150 |
| 2016/0091773 A1* | 3/2016 | Mizoguchi | G03B 21/14 |
| | | | 359/199.1 |
| 2018/0047321 A1* | 2/2018 | Hirakura | H04N 9/3188 |
| 2018/0047371 A1* | 2/2018 | Aimi | G10G 5/00 |
| 2019/0316768 A1* | 10/2019 | Saito | F21V 29/67 |
| 2019/0346743 A1* | 11/2019 | Torobu | G03B 13/36 |
| 2020/0174350 A1* | 6/2020 | Chang | G03B 21/142 |
| 2020/0271947 A1* | 8/2020 | Hu | H02K 41/0356 |
| 2020/0272025 A1* | 8/2020 | Hu | G02B 7/04 |
| 2020/0363700 A1* | 11/2020 | Miyakawa | F21V 5/045 |
| 2022/0137493 A1* | 5/2022 | Chen | G03B 21/142 |
| | | | 353/122 |

FOREIGN PATENT DOCUMENTS

| | | |
|---|---|---|
| JP | 2015-176019 A | 10/2015 |
| JP | 2016-071232 A | 5/2016 |
| JP | 2016-186557 A | 10/2016 |
| JP | 2019-53128 A | 4/2019 |

* cited by examiner

OPTICAL DEVICE, PROJECTOR, AND METHOD FOR CONTROLLING OPTICAL DEVICE

The present application is based on, and claims priority from JP Application Serial Number 2019-178728, filed Sep. 30, 2019, the disclosure of which is hereby incorporated by reference herein in its entirety.

BACKGROUND

1. Technical Field

The present disclosure relates to an optical device, a projector, and a method for controlling the optical device.

2. Related Art

There is a projector that shifts video light to be outputted therefrom in two directions, vertical and horizontal directions, to increase the number of pixels by a factor of four and displays the resultant video image. For example, the projector disclosed in JP-A-2015-176019 includes an optical device including an optical section that outputs video light and an actuator that vibrates the optical section in the vertical and horizontal directions. In the projector disclosed in JP-A-2015-176019, the actuator vibrates the optical section in the vertical and horizontal directions to achieve the pixel shift, and the vibration of the optical section changes in some cases due, for example, to variation in the assembly of the optical device or a change in temperature. When the vibration of the optical section changes, an error could occur in the amount of pixel shift. It is therefore preferable to detect the actual amount of pixel shift with a sensor and perform feedback control that allows the result of the detection performed by the sensor to be reflected in the control of the operation of driving the actuator. JP-A-2015-176019 describes that a position sensor that detects the vertical position of the optical section and a position sensor that detects the horizontal position of the optical section, the position of the optical section is always monitored based on the results of the detection performed by the two position sensors, and servo control is performed on the actuator in accordance with the result of the monitoring.

Providing the two position sensors and performing the servo control on the inclination of the optical section, as described in JP-A-2015-176019, however, causes problems of an increase in the circuit scale of the optical device and a complicated structure of the optical device.

SUMMARY

An optical device according to an aspect of the present disclosure includes a movable section including an optical section that has alight incident surface on which video light is incident, deflects the video light in accordance with an angle of incidence of the video light incident on the light incident surface, and outputs the deflected video light and a holder that supports the optical section, a first actuator that rotates the movable section around a first axis, a second actuator that rotates the movable section around a second axis that intersects the first axis, a drive circuit that supplies the first actuator with a first drive signal that drives the first actuator and the second actuator with a second drive signal that drives the second actuator, and a sensor that detects a position of the optical section. The drive circuit adjusts the first and second drive signals in accordance with the position of the optical section detected with the sensor, and the sensor is disposed in a position different from positions on the first and second axes.

A projector according to another aspect of the present disclosure includes the optical device described above.

A method for controlling an optical device according to another aspect of the present disclosure is a method for controlling an optical device including a movable section including an optical section that has a light incident surface on which video light is incident, deflects the video light in accordance with an angle of incidence of the video light incident on the light incident surface, and outputs the deflected video light and a holder that supports the optical section, a first actuator that rotates the movable section around a first axis, and a second actuator that rotates the movable section around a second axis that intersects the first axis. The method includes causing a sensor disposed in a position different from positions on the first and second axes to detect a position of the optical section and adjusting a first drive signal that drives the first actuator and a second drive signal that drives the second actuator in accordance with the position of the optical section detected with the sensor.

DESCRIPTION OF EXEMPLARY EMBODIMENTS

Figure 1:
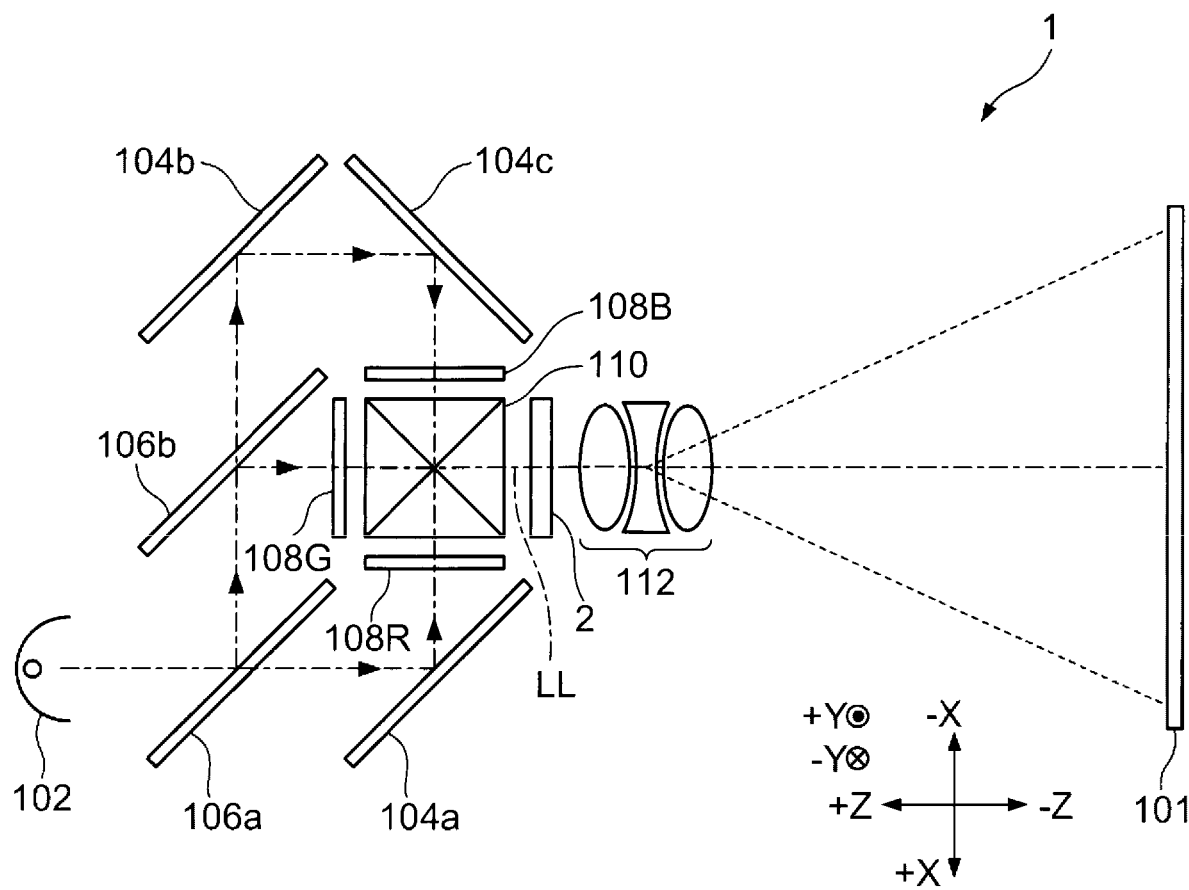
FIG. 1 is a descriptive diagram showing the optical configuration of a projector according to an embodiment of the present disclosure.

An embodiment will be described below with reference to the drawings. It is noted in the drawings that the dimension and scale of each portion differ from actual values as appropriate. A variety of technically preferable restrictions are imposed on the embodiment described below, but the embodiment is not limited to the forms described below.

1. Embodiment

FIG. 1 is a descriptive diagram showing the optical configuration of a projector according to the present embodiment. A projector 1 shown in FIG. 1 is an LCD-based (liquid-crystal-display-based) projector. The projector 1 displays video images on a screen 101 based on an externally inputted video signal. The projector 1 includes a light source 102, a mirror 104a, a mirror 104b, a mirror 104c, a dichroic mirror 106a, a dichroic mirror 106b, a liquid crystal display device 108R, a liquid crystal display device 108G, a liquid crystal display device 108B, a dichroic prism 110, an optical device 2, and a projection system 112. In the following description, a direction +X, a direction −X, a direction +Y, a direction −Y, a direction +Z, and a direction −Z are defined, as shown in FIG. 1. The direction +X is a horizontal scan direction, and the direction −X is the direction opposite the direction +X. The direction −Y is a vertical scan direction, and the direction +Y is the direction opposite the direction −Y. The direction +Z is the direction from the screen 101 toward the projector 1, and the direction −Z is the direction opposite the direction +Z. In the following description, an axis along the directions +X and −X is called an axis X, an axis along the directions +Y and −Y is called an axis Y, and an axis along the directions +Z and −Z is called an axis Z. The axes X, Y, and Z are perpendicular to one another.

Examples of the light source 102 may include a halogen lamp, a mercury lamp, an LED (light emitting diode), and a laser light source. A light source that outputs white light is used as the light source 102. The light outputted from the light source 102 is separated by the dichroic mirror 106a, for example, into red light and light having the other colors. The red light is reflected off the mirror 104a and then incident on the liquid crystal display device 108R. The light having the other colors is further separated by the dichroic mirror 106b into green light and blue light. The green light is incident on the liquid crystal display device 108G, and the blue light is reflected off the mirrors 104b and 104c and then incident on the liquid crystal display device 108B.

The liquid crystal display devices 108R, 108G, and 108B are each used as a spatial light modulator. The liquid crystal display devices 108R, 108G, and 108B are transmissive spatial light modulators corresponding to red, green, and blue primary colors, respectively. The liquid crystal display devices 108R, 108G, and 108B each have pixels arranged in a matrix formed, for example, of 1080 rows arranged in the vertical direction and 1920 columns arranged in the horizontal direction. That is, the liquid crystal display devices 108R, 108G, and 108B each have a resolution of 1920× 1080, that is, a resolution of 2K. The pixels each adjust the amount of incident light that passes through the pixel, and the liquid crystal display devices 108R, 108G, and 108B cooperatively control the light quantity distribution across the pixels. The light spatially modulated by the liquid crystal display device 108R, the light spatially modulated by the liquid crystal display device 108G, and the light spatially modulated by the liquid crystal display device 108B are combined by the dichroic prism 110 with one another, and full-color video light LL thus exits out of the dichroic prism 110. The video light LL having exited out of the dichroic prism 110 is enlarged by the projection system 112 and projected thereby on the screen 101.

The optical device 2 is disposed between the dichroic prism 110 and the projection system 112. The projector 1, in which the optical device 2 shifts the optical path of the video light LL in the vertical and horizontal directions, displays an image having a resolution of 4K on the screen 101. The vertical direction refers to the direction along the axis Y, and the horizontal direction refers to the direction along the axis X. The resolution of 4K refers to the resolution achieved by 3840×2160 pixels. In the following description, an image having the resolution of 4K is called a 4K image, and an image having the resolution of 2K is called a 2K image.

Figure 2:
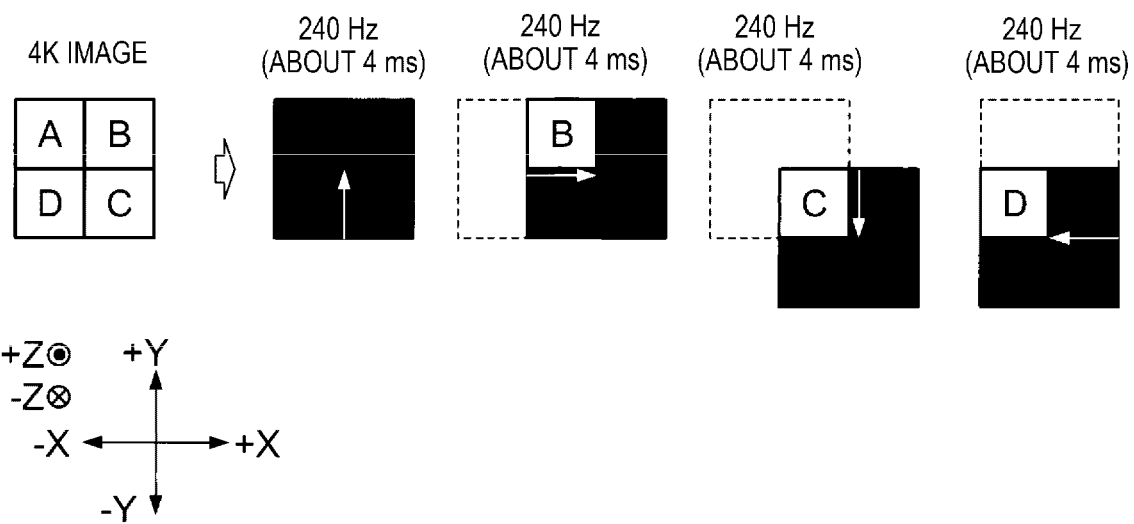
FIG. 2 describes how the projector displays a 4K image.

In a more detailed description, the projector 1 divides a 4K image into four 2k images, shifts the positions of the four 2K images from each other, and sequentially projects the shifted 2K images to project the 4K image. Specifically, the projector 1 sequentially projects four pixels, pixels A, B, C, and D adjacent to each other in the 4K image while the optical device 2 shifts the optical path of the video light LL to shift the projection position, as shown in FIG. 2. For example, when the frame rate is 60 Hz, the projector 1 projects the four 2K images at 240 Hz while shifting the projection position. Although will be described later in detail, the optical device 2 includes a glass plate that transmits the video light LL. In the present embodiment, changing the inclination of the glass plate allows the positions where the four pixels adjacent to each other are displayed in the 4K image to be changed based on glass refraction.

Figure 3:
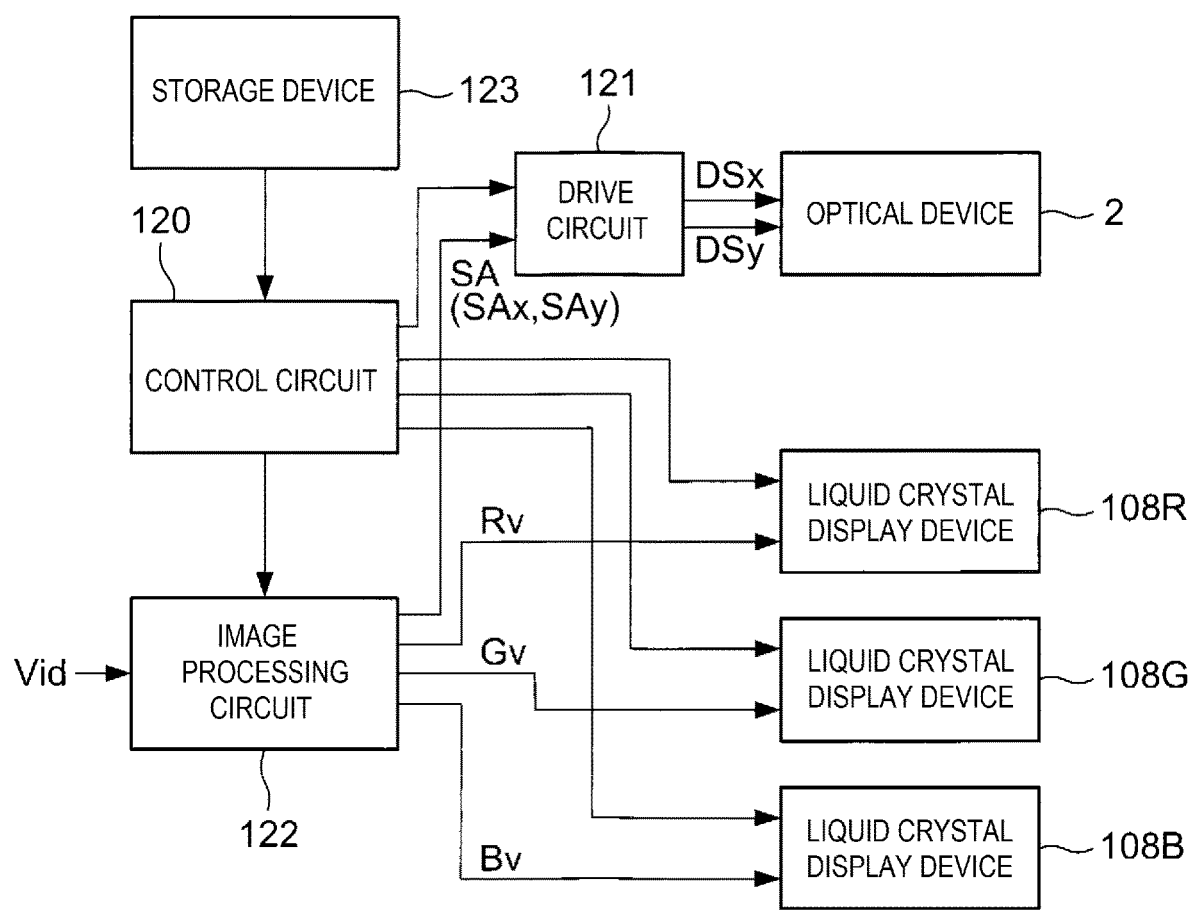
FIG. 3 is a block diagram showing the electrical configuration of the projector.

FIG. 3 is a block diagram showing the electrical configuration of the projector 1. The projector 1 includes a control circuit 120, a drive circuit 121, an image processing circuit 122, and a storage device 123. The storage device 123 includes a ROM (read only memory) and a RAM (random access memory). The storage device 123 stores setting values relating to the quality of a projected image, information on a variety of functions, information to be processed by the control circuit 120, and other pieces of information. Although not shown in FIG. 3, the storage device 123 stores a program that causes the control circuit 120 to carry out a control method according to the present disclosure.

The control circuit 120 includes a processor, for example, a CPU (central processing unit). The control circuit 120 executes the program stored in the storage device 123 to control each portion of the projector 1. Specifically, the control circuit 120 writes data signals onto the liquid crystal display devices 108R, 108G, and 108B, causes the optical device 2 to shift the optical path, and causes the image processing circuit 122 to produce the data signals, and performs other types of control. The control circuit 120 may be formed of a single processor or a plurality of processors. Part or the entirety of the functions of the control circuit 120 may be achieved by hardware, such as a DSP (digital signal processor), an ASIC (application specific integrated circuit), a PLD (programmable logic device), and an FPGA (field programmable gate array).

The drive circuit 121 produces drive signals DSx and DSy, which drive the optical device 2 based on a sync signal SA outputted by the image processing circuit 122. The sync signal SA outputted from the image processing circuit 122 contains a horizontal sync signal SAx and a vertical sync signal SAy. The drive circuit 121 produces the drive signal DSx based on the sync signal SAx and the drive signal DSy based on the sync signal SAy. The drive circuit 121 supplies an actuator 6b with the produced drive signal DSx and an actuator 6a with the produced drive signal DSy.

The image processing circuit 122 separates an image signal Vid supplied from an external apparatus that is not shown into a red image signal, a green image signal, and a blue image signal corresponding to the three primary colors and converts the three image signals into data signals Rv, Gv, and Bv suitable for the operation of the liquid crystal display devices 108R, 108G, and 108B. The converted data signals Rv, Gv, and Bv with the image processing circuit 122 are supplied to the liquid crystal display devices 108R, 108G, and 108B, respectively. The liquid crystal display devices 108R, 108G, and 108B operate based on the data signals Rv, Gv, and Bv, respectively. The image processing circuit 122 may be integrated with the control circuit 120.

Figure 4:
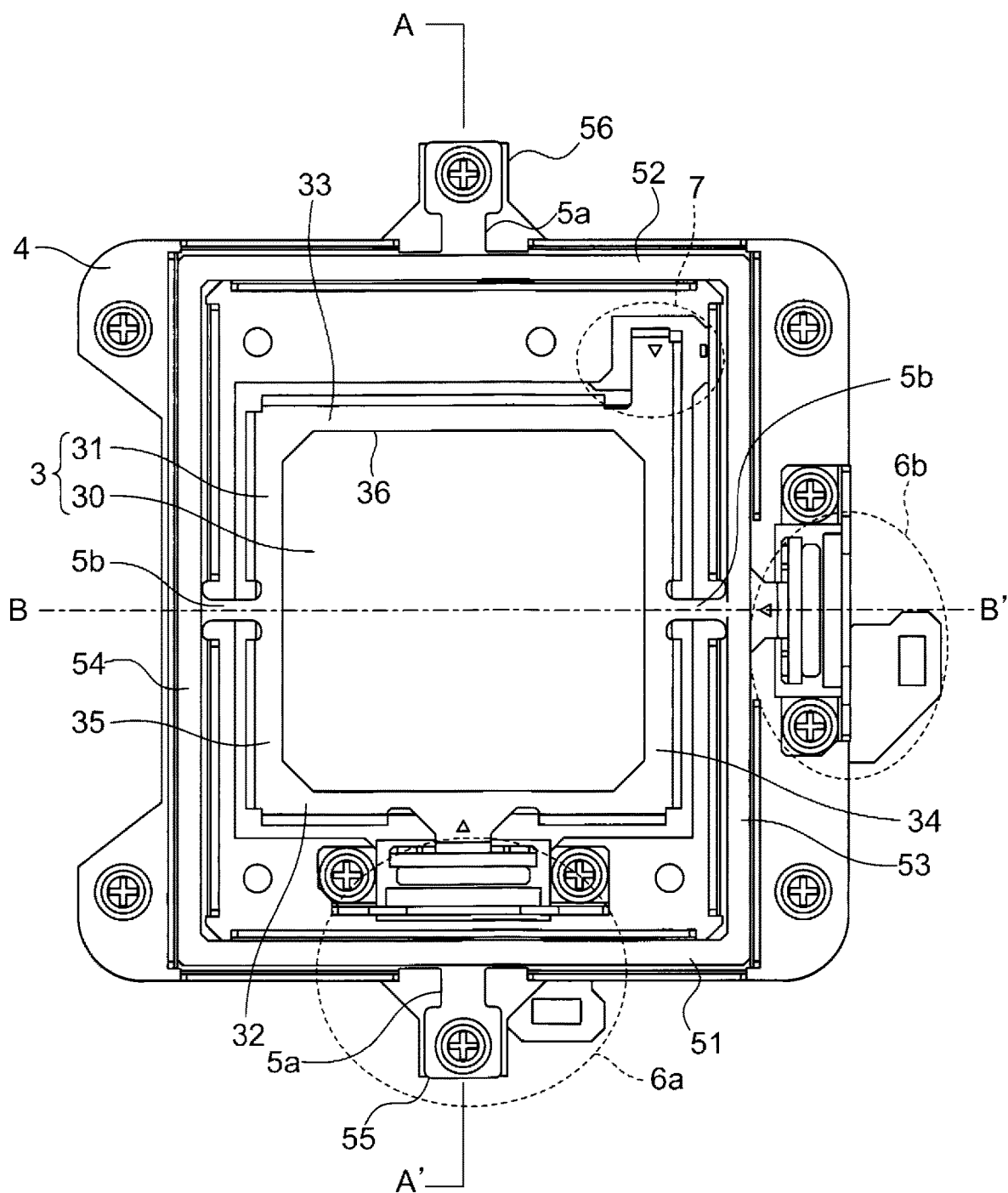
FIG. 4 is a front view of an optical device.

FIG. 4 is a front view of the optical device 2 viewed along the direction +Z. The optical device 2 is used to allow the projector 1 to shift the optical path of the video light LL. The optical device 2 includes a rectangular movable section 3, a frame-shaped support 4, which surrounds the movable section 3, first beams 5a, which fix the support 4, second beams 5b, which link the movable section 3 to the support 3, the actuators 6a and 6b, and a sensor 7, which detects the position of the movable section 3, as shown in FIG. 4.

The movable section 3 includes an optical section 30 and a holder 31, which supports the optical section 30. The optical section 30 is, for example, a glass plate and transmits light. The optical section 30 has a light incident surface on which the video light LL is incident, refracts the video light LL in accordance with the angle of incidence of the video light LL incident on the light incident surface, and outputs the refracted video light LL. When the movable section 3 is located in a reference position where the angle of incidence of the video light LL with respect to the optical section 30 is 0°, the direction of a normal to the optical section 30 coincides with the direction +Z. The optical device 2 is, for example, so disposed in the projector 1 that the front surface of the optical device 2 faces the dichroic prism 110 and the rear surface of the optical device 2 faces the projection system 112. The orientation of the optical device 2 in the direction +Z described above may be reversed.

The optical section 30 is not necessarily made of a specific material and can be made of any of a variety of glass materials, for example, white sheet glass, borosilicate glass and quartz glass. In the present embodiment, the optical section 30 is formed of a glass plate and may instead be made of any material that transmits light and refracts the video light LL. That is, the optical section 30 may be made, for example, of any of a variety of crystal materials, such as crystal quartz and sapphire, or any of a variety of resin materials, such as a polycarbonate-based resin and an acrylic resin, in place of a glass material. It is, however, noted that using a glass plate as the optical section 30 allows a particular increase in rigidity of the optical section 30. A variation in the amount of shift of the optical path of the video light LL shifted by the optical section 30 can therefore be suppressed.

The holder 31 is a quadrangular frame that surrounds the optical section 30. The holder 31 includes a first frame section 32 and a second frame section 33, which extend substantially parallel to the axis X, and a third frame section 34 and a fourth frame section 35, which extend substantially parallel to the axis Y. The movable section 3 further includes a fifth frame section 51 and a sixth frame section 52, which extend substantially parallel to the axis X, and a seventh frame section 53 and an eighth frame section 54, which extend substantially parallel to the axis Y, as shown in FIG. 4. The third frame section 34 is connected to the seventh frame section 53 via one of the second beams 5b, and the fourth frame section 35 is connected to the eighth frame section 54 via the other second beam 5b. The second beams 5b are provided along a line B-B', which is a straight line that connects the middle points of the edges of the holder 31 that extend along the axis Y to each other. The actuator 6b is attached to the second beam 5b that extends from the third frame section 34 in the direction +X. In the present embodiment, the second beams 5b and the holder 31 are so formed as to be integrated with each other. The holder 31 has a rectangular opening 36, which is surrounded by the first frame section 32, the second frame section 33, the third frame section 34, and the fourth frame section 35. The optical section 30 is disposed in the opening 36, and an outer circumferential end portion of the optical section 30 is supported by the first frame section 32, the second frame section 33, the third frame section 34, and the fourth frame section 35. In the present embodiment, the holder 31 is formed of a metal plate made, for example, of stainless steel. In the present embodiment, the length of the edges of the holder 31 that extend in the axis-X direction is equal to the length of the edges of the holder 31 that extend in the axis-Y direction, the length of the edges of the optical section 30 that extend in the axis-X direction is also equal to the length of the edges of the optical section 30 that extend in the axis-Y direction, as shown in FIG. 4.

Figure 5:
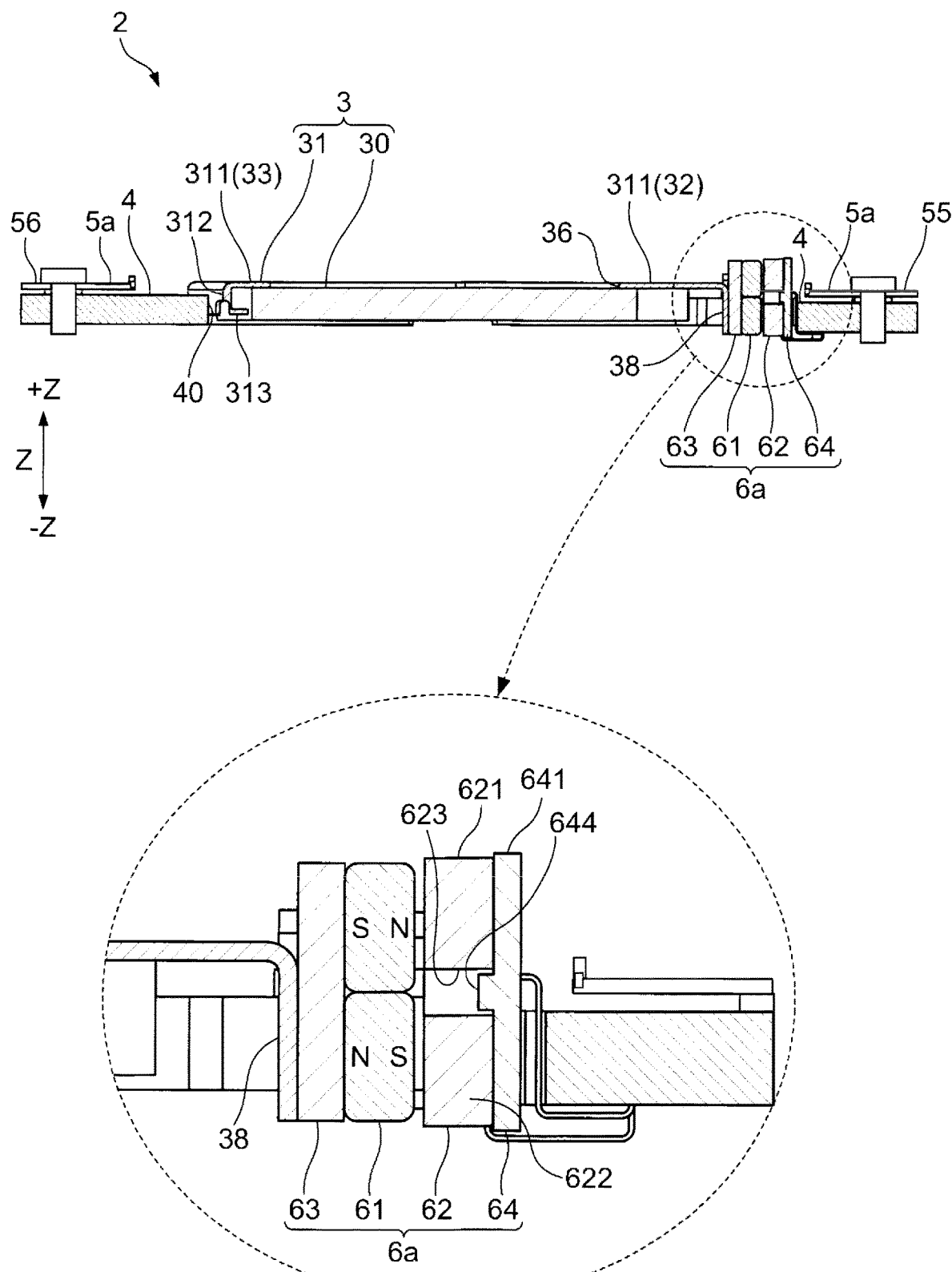
FIG. 5 is a cross-sectional view and a partially enlarged view showing the cross section of the optical device taken along the line A-A' in FIG. 4.

FIG. 5 is a cross-sectional view and a partially enlarged view showing the cross section of the optical device 2 taken along the line A-A' in FIG. 4. The line A-A' in FIG. 4 is a straight line that connects the middle points of the edges of the holder 31 that extend along the axis X to each other. The first beams 5a are provided along the line A-A', as shown in FIG. 4. The fifth frame section 51 is connected to a first fixed section 55 via one of the first beams 5a, and the sixth frame section 52 is connected to a second fixed section 56 via the other first beam 5a. The first fixed section 55 and the second fixed section 56 are fixed to the support 4. The first frame section 32 and the second frame section 33 each include a front plate 311, which covers the +Z-side surface of the outer circumferential end portion of the optical section 30. The front plate 311 of the second frame section includes a side plate 312, which is bent at the outer-circumference-side end of the front plate 311 and extends from the end in the direction −Z, and a hook 313, which protrudes from the −Z-direction-side end of the side plate 312 toward an end surface of the optical section 30. The optical section 30 is fixed to the holder 31 via an adhesive and the hook 313. The front plate 311 of the first frame section 32 includes an attachment section 38, which is bent at the outer-circumference-side end of the front plate 311 and extends from the end in the direction −Z. Although will be described later in detail, the actuator 6a is attached to the attachment section 38. The holder 31 is a bent-structured member formed of a bent metal plate and therefore has a necessary strength although having a structure using a metal plate having a small plate thickness.

The support 4 is made, for example, of resin. The support 4 has a rectangular opening 40, in which the holder 31 is disposed. The support 4 supports the movable section 3 rotatably around a first axis along a line B-B' in FIG. 4 and a second axis along a line A-A' in FIG. 4. The video light LL is incident on the optical section 30 of the movable section 3, for example, along the axis-Z direction. When the movable section 3 rotates around the first or second axis, the angle of incidence of the video light LL incident on the optical section 30 changes. When the angle of incidence of the video light LL incident on the optical section 30 changes from 0°, the optical section 30 refracts and transmits the video light LL incident thereon. Changing the attitude of the optical section 30 in such a way that a target angle of incidence is achieved can therefore control the direction in which the video light LL is deflected and the amount of deflection of the video light LL. The optical section 30 is so sized as appropriate that the optical section 30 transmits the video light LL having exited out of the dichroic prism 110. The optical section 30 is preferably substantially colorless and transparent. An antireflection film may be formed on each of the light incident surface of the optical section 30 on which the video light LL is incident and the light exiting surface of the optical section 30 via which the video light LL exits. The holder 31, the support 4, the first beams 5a, and the second beams 5b are made of stainless steel or resin and can therefore lower the effect of the environmental temperature. A compact optical device 2 having a low resonant frequency can therefore be provided. For example, an optical device 2 having a resonant frequency of about 200 kHz can be provided.

The actuator 6a is provided along the line A-A', that is, the second axis, as shown in FIG. 4. The actuator 6b is provided along the line B-B', that is, the first axis. The drive signal DSy is given to the actuator 6a, and the drive signal DSx is given to the actuator 6b. The actuator 6a rotates the movable section 3 around the first axis in accordance with the drive signal DSy. More specifically, the actuator 6a rotates the holder 31, which includes the first frame section 32, the second frame section 33, the third frame section 34, and the fourth frame section 35, around the first axis in accordance with the drive signal DSy. The actuator 6b rotates the movable section 3 around the second axis, which intersects the first axis, in accordance with the drive signal DSx. More specifically, the actuator 6b rotates the movable section 3, which includes the fifth frame section 51, the sixth frame section 52, the seventh frame section 53, and the eighth frame section 54, around the second axis in accordance with the drive signal DSx. The actuator 6a is an example of the first actuator in the present disclosure, and the actuator 6b is an example of the second actuator in the present disclosure. The drive signal DSy is an example of a first drive signal having a waveform in accordance with which the first actuator is driven, and the drive signal DSx is an example of a second drive signal having a waveform in accordance with which the second actuator is driven. The actuators 6a and 6b have the same configuration. The configuration of the actuator 6a will be described below with reference to FIG. 5.

The actuator 6a includes a permanent magnet 61 and a coil 62, which face each other, as shown in FIG. 5. The drive signal DSy is given to the coil 62 of the actuator 6a. Although not shown in detail, the actuator 6b also includes a permanent magnet 61 and a coil 62, which face each other, and the drive signal DSx is given to the coil 62 of the actuator 6b. The permanent magnet 61 of the actuator 6a is an example of the first magnet in the present disclosure, and the coil 62 of the actuator 6a is an example of the first coil in the present disclosure. The permanent magnet 61 of the actuator 6b is an example of the second magnet in the present disclosure, and the coil 62 of the actuator 6b is an example of the second coil in the present disclosure.

The actuator 6a includes a magnet holding plate 63, to which the permanent magnet 61 is fixed. The magnet holding plate 63 is a flat plate and is fixed to the attachment section 38. That is, the permanent magnet 61 is fixed to the holder 31 via the magnet holding plate 63. The magnet holding plate 63 is made of metal, for example, iron and serves as a back yoke. The actuator 6a further includes a coil holding plate 64, which holds the coil 62, and the coil holding plate 64 is fixed to the support 4. That is, the coil 62 is fixed to the support 4 via the coil holding plate 64. The coil holding plate 64 is made of metal, for example, iron and serves as a back yoke.

The coil holding plate 64 includes a plate-shaped base 641, to which the coil 62 is fixed, and a protrusion 644, which protrudes from the base 641. The protrusion 644 is provided at a portion of the base 641 that is the portion to which the coil 62 is fixed and protrudes in the direction perpendicular to the surface to which the coil 62 is fixed. The coil holding plate 64 is disposed in a position where the coil 62, which is fixed to the base 641, and the permanent magnet 61, which is fixed to the attachment section 38 via the magnet holding plate 63, face each other with a predetermined gap therebetween.

The permanent magnet 61 has a first opposing surface where the S and N poles are formed. The permanent magnet 61 can, for example, be a neodymium magnet, a samarium-cobalt magnet, a ferrite magnet, or an alnico magnet. In the present embodiment, the permanent magnet 61 is a neodymium magnet. A neodymium magnet can provide necessary magnetic force even in the form of a small magnet and can therefore reduce the size and weight of the actuator 6a. The coil 62 has a second opposing surface that faces the first opposing surface. The first and second opposing surfaces are parallel to each other. The term "parallel" used herein is not necessarily completely parallel and may deviate from the completely parallel state to some extent as long as the function of the actuator 6a can be provided. The permanent magnet 61 and the coil 62 are so disposed and orientated that the first and second opposing surfaces intersect the surface of the optical section 30.

In the present embodiment, the coil 62 is an air-core coil having an oval shape. The coil 62 has two edges, effective edges 621 and 622 extending substantially in parallel to the axis Y. A central hole 623 is provided between the effective edges 621 and 622. The coil 62 is positioned relative to the base 641 when the protrusion 644 is disposed in the central hole 623.

In the permanent magnet 61, the magnetic poles are formed at the first opposing surface, which faces the coil 62, and the S and N poles are arranged in the direction Z along the first opposing surface. When the movable section 3 is located in a reference position where the direction of a normal to the optical section 30 is parallel to the axis-Z direction, one of the S and N poles of the permanent magnet 61 faces the effective edge 621 and the other one of the S and N poles of the permanent magnet 61 faces the effective edge 622 in the actuator 6a.

When the coil 62 is energized, currents flow through the effective edges 621 and 622 in opposite directions. The permanent magnet 61 therefore moves along the second opposing surface in the direction +Z or −Z. In the present embodiment, the S and N poles of the permanent magnet 61 are arranged in the direction Z, and the effective edges 621 and 622 are arranged in the direction Z. The actuator 6a therefore moves the permanent magnet 61 in the axis-Z direction when the coil 62 conducts the currents. As a result, the movable section 3 rotates around the first axis, and the optical section 30 inclines in accordance with the amount of rotation of the movable section 3. Similarly, the actuator 6b moves the permanent magnet 61 in the axis-Z direction when the coil 62 conducts the currents. As a result, the movable section 3 rotates around the second axis, and the optical section 30 inclines in accordance with the amount of rotation of the movable section 3.

Figure 6:
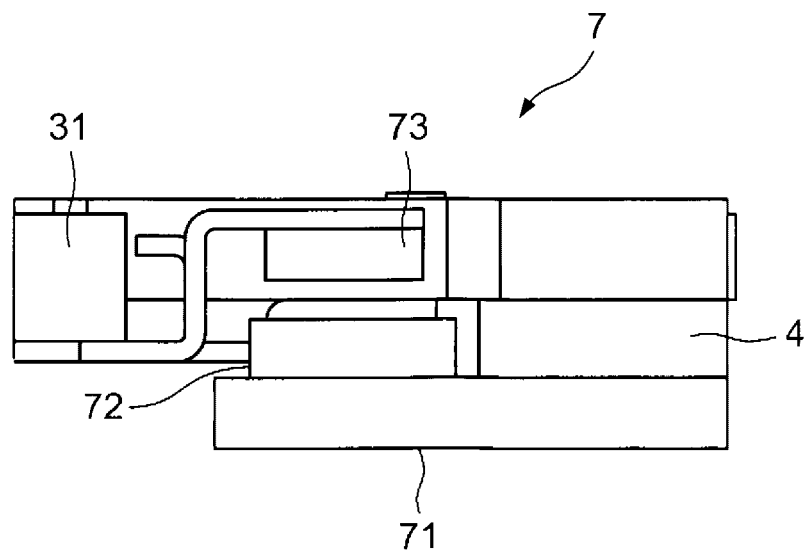
FIG. 6 shows an example of the configuration of a sensor.

The sensor 7 is disposed in a position different from the positions on the first and second axes in a plan view in which the optical device 2 is viewed along the direction +Z, as shown in FIG. 4. In the present embodiment, the sensor 7 is disposed in a position corresponding to one of the four corners of the holder 31, as shown in FIG. 4. The sensor 7 outputs a detection signal having a waveform according to a change in the position of the optical section 30. FIG. 6 shows an example of the configuration of the sensor 7. The sensor 7 is a magnetism sensor including a sensor substrate 71, a Hall sensor 72, and a magnet 73, as shown in FIG. 6. The Hall sensor 72 includes a Hall device. The Hall sensor 72 is mounted on the sensor substrate 71, and the sensor substrate 71 is fixed to the support 4. That is, the Hall sensor 72 is fixed to the support 4 via the sensor substrate 71. On the other hand, the magnet 73 is fixed to the holder 31. The magnet 73 may be a permanent magnet or an electromagnet. The Hall sensor 72 and the magnet 73 are disposed in positions where the distance between the magnet 73 and the Hall sensor 72 changes in accordance with the rotation of the movable section 3.

The Hall sensor 72 outputs a voltage according to the strength of the magnetic field produced by the magnet 73. The sensor 7 can therefore measure the distance between the magnet 73 and the Hall sensor 72 in a noncontact manner. In the optical device 2, the sensor 7 is so disposed that the distance between the magnet 73 and the Hall sensor 72 changes in accordance with the rotation of the movable section 3 around the first or second axis. The axis-Z direction displacement of the holder 31, on which the magnet 37 is mounted, can therefore be measured in a noncontact manner based on the output from the Hall sensor 72.

Figure 7:
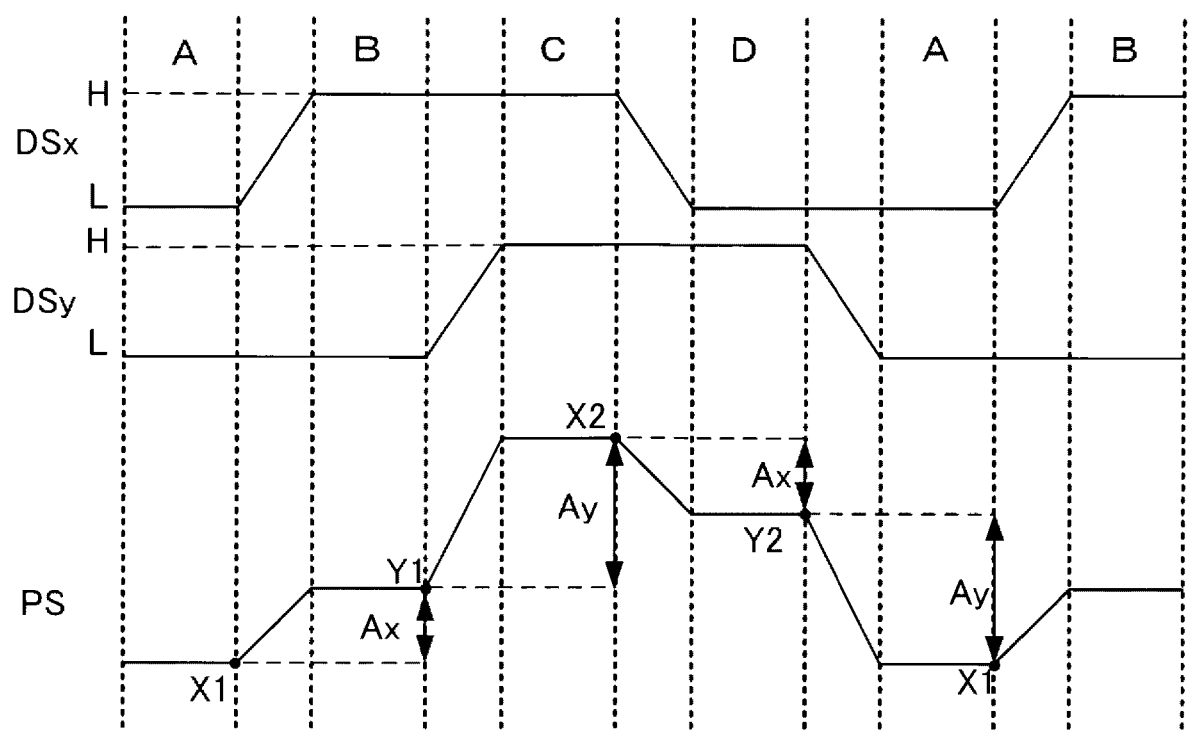
FIG. 7 shows an example of the waveforms of drive signals and the waveform of a detection signal outputted by the sensor.

The magnitude of the inclination of the optical section 30 for the pixel shift depends on the pixel interval. In the present embodiment, the magnitude of the inclination of the optical section 30 at the time of the pixel shift corresponds to half the pixel interval, which is ±0.152 degrees in terms of angle. In the present embodiment, the optical section 30 rotates around each of the first and second axes at a frequency of 60 Hz, and images are therefore projected in a 240-Hz cycle in one frame. When the thus projected images are superimposed on one another, an image having the fourfold resolution is projected. The optical section 30 has a unique resonant frequency, as described above, and is so designed that the resonant frequency does not coincide with an odd-order harmonic wave of the rotational frequency. When a drive signal having a trapezoidal waveform having an appropriate inclination is supplied to the actuators 6a and 6b, the waveform driven in accordance with the optical section 30 can also be a trapezoidal waveform. FIG. 7 shows an example of the waveform of the drive signal DSx supplied from the drive circuit 121 to the actuator 6b, the waveform of the drive signal DSy supplied from the drive circuit 121 to the actuator 6a, and the waveform of a detection signal PS outputted by the sensor 7.

The drive signals DSx and DSy are out of phase by a phase difference of a quarter wavelength. The phase difference allows the four-location pixel shift. The periods for which the drive signals DSx and DSy are both fixed in FIG. 7 are each a period for which the pixels are stationary. In the present embodiment, the sensor 7 detects the magnitude of the inclination of the optical section 30, and the control circuit 120 performs feedback control in such a way that the optical section 30 inclines by a predetermined amount. FIG. 7 shows the waveform of a voltage outputted from the sensor 7 when the pixels A, B, C, and D in FIG. 2 are shifted to the respective positions.

The feedback control is achieved by adjusting the drive signals DSx and DSy based on the value of the output from the sensor 7 in such a way that the amount of rotation of each of the actuators 6a and 6b is a predetermined amount of rotation. Although will be described later in detail, the adjustment of the drive signals DSx and DSy based on the value of the output from the sensor 7 is performed by the drive circuit 121 under the control of the control circuit 120. The configuration of the drive circuit 121 will be described later in detail.

For example, in the example shown in FIG. 7, the amount of rotation around the first axis is Ax, and the amount of rotation around the second axis is Ay. The drive circuit 121 adjusts the drive signals DSx and DSy in such a way that the amounts of rotation Ax and Ay each have a predetermined value. Specifically, the amounts of rotation Ax and Ay can each be determined from sample values that are values of the detection signal PS sampled at specific timings. In the example shown in FIG. 7, sample values X1, X2, Y1, and Y2 can be used to determine the amount of rotation Ax based on Expression (1) below and the amount of rotation Ay based on Expression (2) below. The sample values are each not necessarily a sample value at one sampling timing and may instead be the average of a plurality of sample values at a plurality of sampling timings. Further, in the example shown in FIG. 7, the sampling is performed at the start of a rise or a fall of the waveform, that is, at the start of a change in the waveform and may instead be performed at the end of a change in the waveform.

$$Ax = Y1 - X1 = X2 - Y2 \tag{1}$$

$$Ay = X2 - Y1 = Y2 - X1 \tag{2}$$

Figure 8:
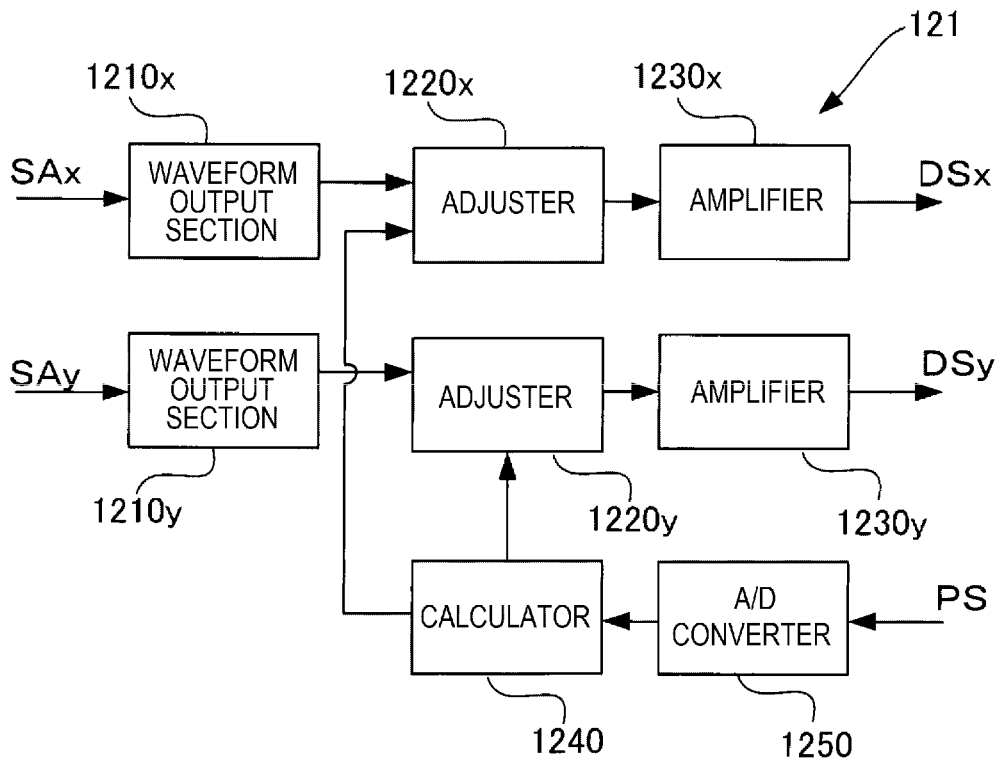
FIG. 8 is a block diagram showing an example of the configuration of a drive circuit.

FIG. 8 is a block diagram showing an example of the configuration of the drive circuit 121. The drive circuit 121 includes waveform output sections 1210x and 1210y, adjusters 1220x and 1220y, amplifiers 1230x and 1230y, a calculator 1240, and an A/D converter 1250, as shown in FIG. 8.

The sync signal SAx is given to the waveform output section 1210x. The waveform output section 1210x produces a trapezoidal drive signal DSx, which synchronizes with the sync signal SAx. Although not illustrated in detail in FIG. 8, the waveform output section 1210x includes a waveform memory having stored waveform data representing the waveform of the drive signal DSx and a D/A converter. The waveform output section 1210x reads the waveform data stored in the waveform memory in response to the sync signal SAx as a trigger, converts the read waveform data into an analog signal in the D/A converter, and outputs the analog signal, which is the result of the conversion. Using the D/A converter and changing the conversion clock frequency can change the inclination of the trapezoidal wave. Further, changing the waveform data allows output of an arbitrary waveform. The waveform output section 1210y has the same configuration as that of the waveform output section 1210x. The sync signal SAy is given to the waveform output section 1210y. The waveform output section 1210y produces a trapezoidal drive signal DSy, which synchronizes with the sync signal SAy.

The adjuster 1220x changes the amplitude of the drive signal DSx in accordance with a gain given from the calculator 1240. The adjuster 1220x is formed of a circuit using a digital potentiometer so as to be capable of electrically changing the resistance of the adjuster 1220x. The interface for the digital potentiometer may, for example, be an I2C bus. Using an I2C bus allows the digital potentiometer to accept control from a processor, such as a CPU. The adjuster 1220y has the same configuration as that of the adjuster 1220x. The adjuster 1220y changes the amplitude of the drive signal DSy in accordance with a gain given from the calculator 1240.

The amplifier 1230x amplifies the drive signal DSx the amplitude of which has been adjusted by the adjuster 1220x and outputs the amplified drive signal DSx to the actuator 6b. The amplifier 1230y amplifies the drive signal DSy the amplitude of which has been adjusted by the adjuster 1220y and outputs the amplified drive signal DSy to the actuator 6a.

The detection signal PS outputted from the sensor 7 is given to the A/D converter 1250. The A/D converter 1250 samples the detection signal PS and captures sample values produced by the sampling. The calculator 1240 calculates the gain by using the sample values captured by the A/D converter 1250 and controls the adjusters 1220$x$ and 1220$y$ in accordance with the result of the calculation.

The feedback control for achieving the pixel shift and calibration performed before the feedback control will next be described.

Figure 9:
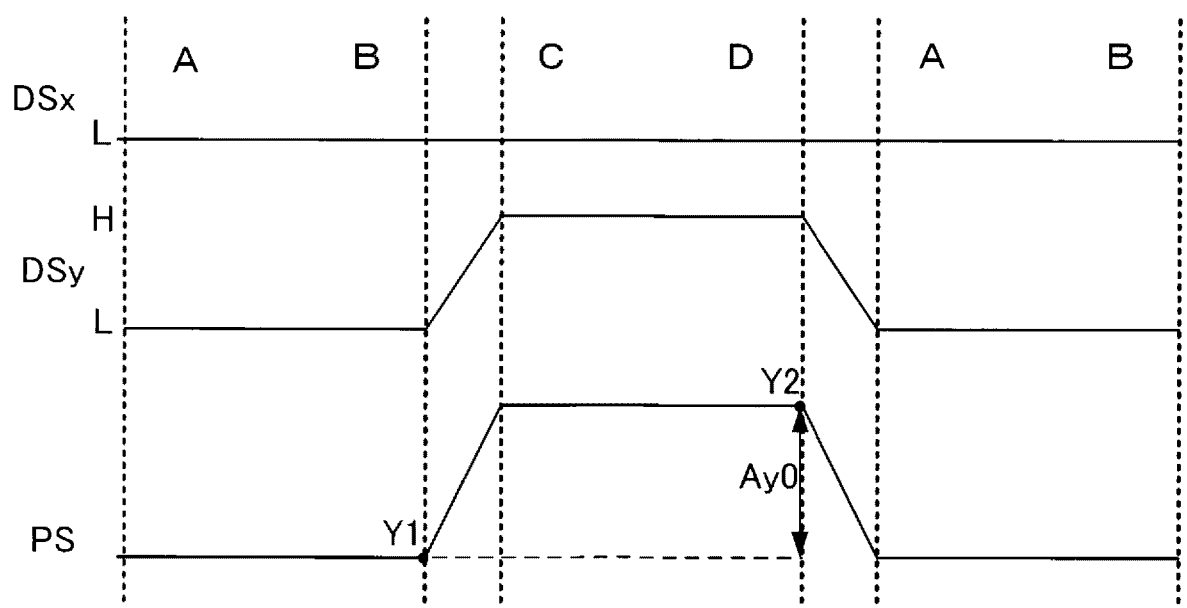
FIG. 9 describes calibration for rotation around a first axis.
Figure 10:
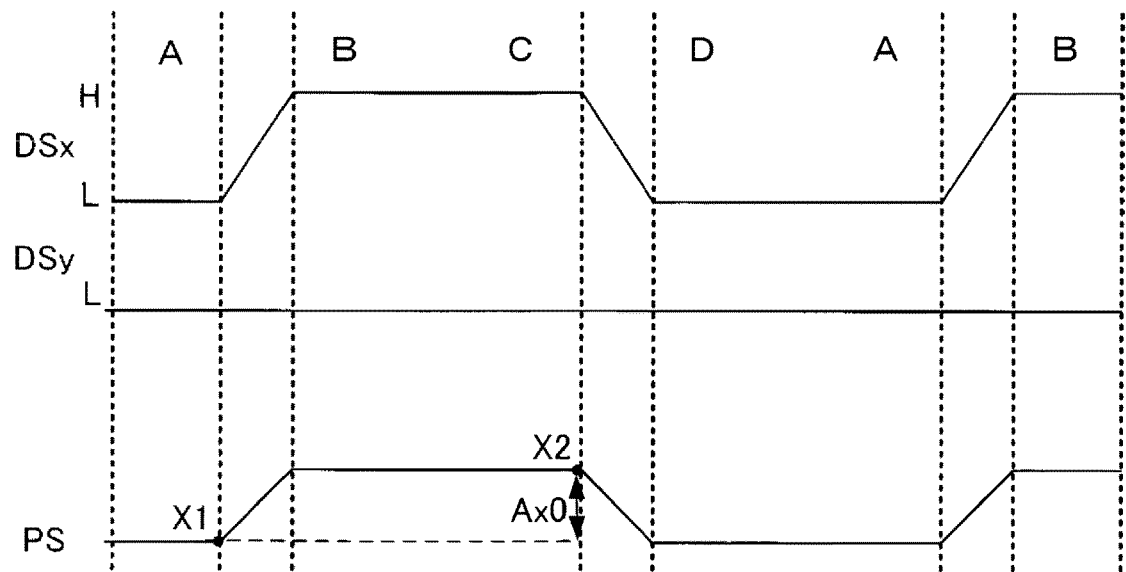
FIG. 10 describes the calibration for rotation around a second axis.

The calibration will first be described. The feedback control is achieved by controlling the sensor value acquired by the sensor 7 in such a way that the sensor value is equal to a target value specified in advance. The calibration is the process of acquiring the target value in the feedback control. The calibration is achieved by rotating the optical section 30 around the first or second axis in such a way that the optical section 30 has a predetermined inclination while measuring the inclination of the optical section 30 with a laser displacement gauge or any other device with respect to each of the first and second axes and recording the value outputted from the sensor 7 as the target value at the time when the predetermined inclination is achieved. The calibration is performed for each of the first and second axes. FIG. 9 shows the waveforms of the drive signals DSx and DSy in the calibration for the rotation around the first axis, and FIG. 10 shows the waveforms of the drive signals DSx and DSy in the calibration for the rotation around the second axis. Target values Ax0 and Ay0 can be determined by using the sample values X1, X2, Y1, and Y2 by Expressions (3) and (4) below.

$$Ax0=X2-X1 \quad (3)$$

$$Ay0=Y2-Y1 \quad (4)$$

Figure 11:
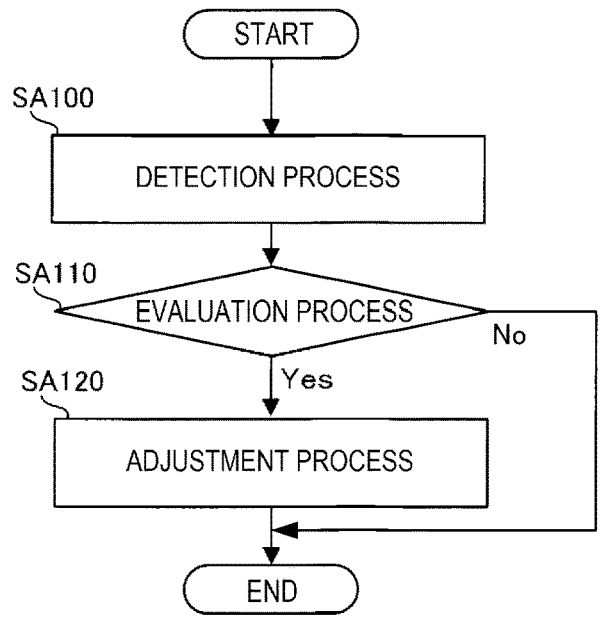
FIG. 11 is a flowchart showing the procedure of a control method according to the present embodiment.

FIG. 11 is a flowchart showing the procedure of the control method carried out by the control circuit 120. The control method shown in the flowchart of FIG. 11 is carried out whenever the displayed pixel is switched as follows: pixel A→pixel B→pixel C→pixel D→pixel A, . . . . The control method includes a detection process SA100, an evaluation process SA110, and an adjustment process SA120, as shown in FIG. 11.

In the detection process SA100, the control circuit 120 controls the drive circuit 121 in such a way that one of the drive signals DSx and DSy changes and causes the calculator 1240 to acquire the maximum and minimum of the detection signal PS. For example, in the time segment in which the displayed pixel is switched from the pixel A to the pixel B, the control circuit 120 controls the drive circuit 121 in such a way that the level of the drive signal DSx changes from a level L to a level H. In the time segment in which the displayed pixel is switched from the pixel B to the pixel C, the control circuit 120 controls the drive circuit 121 in such a way that the level of the drive signal DSy changes from the level L to the level H. In the time segment in which the displayed pixel is switched from the pixel C to the pixel D, the control circuit 120 controls the drive circuit 121 in such a way that the level of the drive signal DSx changes from the level H to the level L. In the time segment in which the displayed pixel is switched from the pixel D to the pixel A, the control circuit 120 controls the drive circuit 121 in such a way that the level of the drive signal DSy changes from the level H to the level L.

Figure 12:
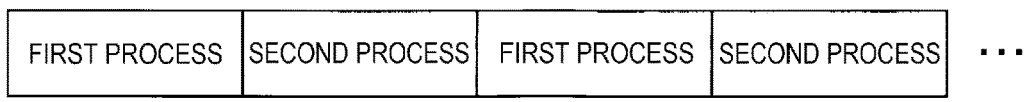
FIG. 12 describes the operation of the projector.

The time segment in which the displayed pixel is switched from the pixel A to the pixel B and the time segment in which the displayed pixel is switched from the pixel C to the pixel D are each an example of a first time segment in which the waveform of the first drive signal is changed, and the detection process SA100 carried out in the first time segment is an example of the first process in the present disclosure. The time segment in which the displayed pixel is switched from the pixel B to the pixel C and the time segment in which the displayed pixel is switched from the pixel D to the pixel A are each an example of a second time segment in which the waveform of the second drive signal is changed, and the detection process SA100 carried out in the second time segment is an example of the second process in the present disclosure. In the present embodiment, since the control method shown in FIG. 11 is carried out whenever the displayed pixel is switched as follows: pixel A→pixel B→pixel C→pixel D→pixel A, . . . , as described above, the first process and the second process are alternately carried out, as shown in FIG. 12.

In the evaluation process SA110, the control circuit 120 causes the calculator 1240 to calculate the difference between the maximum and the minimum acquired in the detection process SA100 as the amount of rotation and causes the calculator 1240 to evaluate whether or not the absolute value of the difference between the calculated amount of rotation and the target value is greater than or equal to a predetermined threshold. In more detail, when the drive signal DSx is changed in the detection process SA100, the control circuit 120 causes the calculator 1240 to evaluate whether or not the difference between the calculated amount of rotation and the target value Ax0 is greater than or equal to a predetermined threshold. On the other hand, when the drive signal DSy is changed in the detection process SA100, the control circuit 120 causes the calculator 1240 to evaluate whether or not the difference between the calculated amount of rotation and the target value Ay0 is greater than or equal to a predetermined threshold. When the result of the evaluation in the evaluation process SA110 is "Yes," the control circuit 120 carries out the adjustment process SA120 and then terminates the control method. When the result of the evaluation in the evaluation process SA110 is "No," the control circuit 120 does not carry out the adjustment process SA120 and terminates the control method.

In the adjustment process SA120, the control circuit 120 causes the adjuster 1220$x$ or 1220$y$ to adjust the gain in accordance with the difference between the calculated amount of rotation and the target value. For example, when the drive signal DSx is changed in the detection process SA100, the control circuit 120 causes the adjuster 1220$x$ to adjust the gain in accordance with the difference between the target value and the amount of rotation. Specifically, when the target value is greater than the amount of rotation, the control circuit 120 increases the gain, and when the target value is smaller than the amount of rotation, the control circuit 120 decreases the gain. When the drive signal DSy is changed in the detection process SA100, the control circuit 120 causes the adjuster 1220$y$ to adjust the gain in accordance with the difference between the target value and the amount of rotation. The amount of rotation determined from the difference between the maximum and the minimum acquired in the detection process SA100 represents the amount of actual pixel shift. The present embodiment therefore allows the result of the detection of the amount of actual pixel shift to be reflected in the control of the operation of driving the movable section 3.

As described above, the present embodiment allows detection of the amount of actual pixel shift and reflection of the result of the detection in the control of the operation of driving the movable section 3. Further, the present embodiment, in which the single sensor 7 detects the amount of pixel shift and no servo control is performed, can avoid an increase in circuit scale of the optical device 2 and a complicated structure of the optical device 2.

2. Other Embodiments (1) In the embodiment described above, the single sensor 7 is disposed at one of the four corners of the holder 31, which is a quadrangular frame, and may instead be disposed in another position. For example, in a plan view viewed along the direction in which the video light LL is incident, the sensor 7 may be disposed on anyone of a first edge that extends from a first corner of the four corners of the holder 31 along the first axis and intersects the second axis or a second edge that extends from the first corner along the second axis and intersects the first axis. Specifically, the sensor 7 may be disposed at any of the first frame section 32, the second frame section 33, the third frame section 34, and the fourth frame section 35. In short, the sensor 7 only needs to be disposed in a position different from positions on the first and second axes in the holder 31. The reason for this is that the sensor 7 disposed in a position on the first axis cannot detect the amount of rotation around the first axis and the sensor 7 disposed in a position on the second axis cannot detect the amount of rotation around the second axis. In the embodiment described above, the first and second edges of the holder 31 have the same length, and the first and second edges may have lengths different from each other. In the embodiment described above, the first axis coincides with the straight line that connects the middle points of the two edges of the holder 31 that extend along the axis Y, and the first axis may not coincide with the straight line. Similarly, in the embodiment described above, the second axis coincides with the straight line that connects the middle points of the two edges of the holder 31 that extend along the axis X, and the second axis may not coincide with the straight line.

When the sensor 7 is disposed at any of the first frame section 32, the second frame section 33, the third frame section 34, and the fourth frame section 35, the sensor 7 may be disposed in a position separate from the first axis by a distance greater than or equal to half the length of the second edge and separate from the second axis by a distance greater than or equal to half the length of the first edge. The reason for this is that the more separate the position of the sensor from the center axis of the rotation, the greater the difference between the maximum and the minimum detected with the sensor 7. The sensor 7 may instead be disposed in a position where the distance from the first axis in the direction along the second axis is equal to the distance from the second axis in the direction along the first axis. It is, however, preferable that the sensor 7, which includes a Hall device, is disposed in a position where the sensor 7 does not overlap with the actuator 6a or 6b in the plan view. The reason for this is to avoid the effect of the magnetic field produced by the permanent magnet 61 on the Hall device.

(2) In the embodiment described above, the magnet 73 of the sensor 7 is fixed to the holder 31, and the sensor substrate 71 and the Hall sensor 72 are fixed to the support 4. The arrangement of the magnet 73 and the arrangement of the sensor substrate 71 and the Hall sensor 72 can be reversed with each other.

(3) In the embodiment described above, the actuators 6a and 6b are each formed of a vibration actuator that produces drive force based on Lorentz force produced by the permanent magnet 61 and the coil 62 facing each other, and an actuator that operates based on another principle can also be used. For example, a piezoelectric actuator may be employed.

(4) In the embodiment described above, the projector 1 including the optical device 2, which notably shows the features of the present disclosure, has been described, and the optical device 2 may be manufactured or sold on a standalone basis. Further, in the embodiment described above, the drive circuit 121, which drives the actuators 6a and 6b provided in the optical device 2, is provided separately from the optical device 2, and the drive circuit 121 may instead be provided in the optical device 2.

3. Aspects Derived from at Least One of Embodiment and Variations

The present disclosure is not limited to the embodiment and variations described above and can be implemented in a variety of other aspects to the extent that the aspects do not depart from the substance of the present disclosure. For example, the present disclosure can be implemented in the following aspects. The technical features in the embodiment described above that correspond to the technical features in the aspects described below can be replaced with other features or combined with each other as appropriate to solve part or the entirety of the problems of the present disclosure or achieve part or the entirety of the effects provided by the present disclosure. Further, when any of the technical features is not described as an essential technical feature in the present specification, the technical feature can be deleted as appropriate.

In an aspect of the optical device described above, the optical device includes a movable section including an optical section that has alight incident surface on which video light is incident, deflects the video light in accordance with the angle of incidence of the video light incident on the light incident surface, and outputs the deflected video light and a holder that supports the optical section, a first actuator, a second actuator, a drive circuit, and a sensor that detects the position of the optical section. The first actuator rotates the movable section around the first axis. The second actuator rotates the movable section around the second axis that intersects the first axis. The drive circuit supplies the first actuator with the first drive signal that drives the first actuator and the second actuator with the second drive signal that drives the second actuator. The sensor is disposed in a position different from the positions on the first and second axes, and the drive circuit adjusts the first and second drive signals in accordance with the position of the optical section detected with the sensor. The aspect allows detection of the amount of actual pixel shift and reflection of the result of the detection in the control of the operation of driving the movable section with no increase in circuit scale of the optical device and no complicated structure of the optical device.

In another aspect of the optical device described above, the first and second drive signals may be out of phase by a predetermined phase difference, and the sensor may alternately carry out the first process of detecting the position of the optical device in accordance with the rotation around the first axis and the second process of detecting the position of the optical device in accordance with the rotation around the second axis. According to the aspect described above, detection of the amount of shift along the first axis and reflection of the result of the detection in the control of the operation of driving the movable section and detection of the amount of shift along the second axis and reflection of the result of the detection in the control of the operation of driving the movable section can be alternately performed.

In another aspect of the optical device described above, the predetermined phase difference may be the phase difference corresponding to the quarter cycle of the first drive signal. According to the aspect described above, detection of the amount of shift along the first axis and reflection of the result of the detection in the control of the operation of driving the movable section and detection of the amount of shift along the second axis and reflection of the result of the detection in the control of the operation of driving the movable section can be alternately performed in the quarter cycle of the first drive signal.

In another aspect of the optical device described above, the waveform of the first drive signal may change in the first time segment for which the first process is carried out, and the waveform of the second drive signal may change in the second time segment for which the second process is carried out. According to the aspect described above, the amount of shift resulting from a change in the first drive signal is detected in the first time segment, and the amount of shift resulting from a change in the second drive signal is detected in the second time segment.

In another aspect of the optical device described above, the sensor may output a detection signal having a waveform according to a change in the position of the optical section, and the drive circuit may determine the amount of rotation of the movable section based on the difference between the maximum and the minimum of sample values of the detection signal. According to the aspect described above, the amount of rotation of the movable section is determined based on the difference between the maximum and the minimum of the sample values of the detection signal.

In another aspect of the optical device described above, the holder may be a quadrangular frame that surrounds the optical section. In the plan view viewed along the direction in which the video light is incident, the first edge of the holder that is the edge extending from the first corner of the four corners of the holder along the first axis may intersect the second axis, and the second edge of the holder that is the edge extending from the first corner along the second axis may intersect the first axis. The sensor may be disposed in the holder.

In another aspect of the optical device described above, the sensor may be disposed in a position separate from the first axis by a distance greater than or equal to half the length of the second edge and separate from the second axis by a distance greater than or equal to half the length of the first edge. The reason for this is that the more separate the position of the sensor from the center axis of the rotation, the greater the difference between the maximum and the minimum detected with the sensor.

In another aspect of the optical device described above, the sensor may be disposed in a position where the distance from the first axis in the direction along the second axis is equal to the distance from the second axis in the direction along the first axis.

In another aspect of the optical device described above, the sensor may be disposed at the first corner.

In another aspect of the optical device described above, the first actuator may include the first magnet provided in the movable section and the first coil to which a current according to the first drive signal is supplied, and the second actuator may include the second magnet provided in the movable section and the second coil to which a current according to the second drive signal is supplied. Further, the sensor may be a magnetism sensor including a Hall sensor and may be disposed in a position where the sensor does not overlap with the first or second actuator in the plan view.

An aspect of the projector described above includes the optical device in any of the aspects described above. The aspect allows detection of the amount of actual pixel shift and reflection of the result of the detection in the control of the operation of driving the movable section with no increase in circuit scale of the projector and no complicated structure of the projector.

An aspect of the method for controlling the optical device described above is a method for controlling an optical device including a movable section including an optical section that has a light incident surface on which video light is incident, deflects the video light in accordance with the angle of incidence of the video light incident on the light incident surface, and outputs the deflected video light and a holder that supports the optical section, a first actuator, and a second actuator. The first actuator rotates the movable section around the first axis. The second actuator rotates the movable section around the second axis that intersects the first axis. In the control method, a sensor disposed in a position different from the positions on the first and second axes detects the position of the optical section. The first drive signal that drives the first actuator and the second drive signal that drives the second actuator are adjusted in accordance with the position of the optical section detected with the sensor. The aspect also allows detection of the amount of actual pixel shift and reflection of the result of the detection in the control of the operation of driving the movable section with no increase in circuit scale of the optical device and no complicated structure of the optical device.

What is claimed is:

1. An optical device comprising:
   a movable section including an optical section that has a light incident surface on which video light is incident, deflects the video light in accordance with an angle of incidence of the video light incident on the light incident surface, and outputs the deflected video light and a holder that supports the optical section;
   a first actuator that rotates the movable section around a first axis;
   a second actuator that rotates the movable section around a second axis that intersects the first axis;
   a drive circuit that supplies the first actuator with a first drive signal that drives the first actuator and the second actuator with a second drive signal that drives the second actuator; and
   a sensor that detects a position of the optical section,
   wherein the drive circuit adjusts the first and second drive signals in accordance with the position of the optical section detected with the sensor, and
   the sensor is disposed in a position different from positions on the first and second axes.

2. The optical device according to claim 1,
   wherein the first and second drive signals are out of phase by a predetermined phase difference, and
   the sensor alternately carries out a first process of detecting the position of the optical section in accordance with the rotation around the first axis and a second process of detecting the position of the optical section in accordance with the rotation around the second axis.

3. The optical device according to claim 2,
   wherein the predetermined phase difference is a phase difference corresponding to a quarter cycle of the first drive signal.

4. The optical device according to claim 3,
   wherein a waveform of the first drive signal changes in a first time segment for which the first process is carried out, and a waveform of the second drive signal changes in a second time segment for which the second process is carried out.

5. The optical device according to claim 1,
wherein the sensor outputs a detection signal having a waveform according to a change in the position of the optical section, and
the drive circuit determines an amount of rotation of the movable section based on a difference between a maximum and a minimum of sample values of the detection signal.

6. The optical device according to claim 1,
wherein the holder is a quadrangular frame that surrounds the optical section,
in a plan view viewed along a direction in which the video light is incident, a first edge of the holder that is an edge extending from a first corner of four corners of the holder along the first axis intersects the second axis, and a second edge of the holder that is an edge extending from the first corner along the second axis intersects the first axis, and
the sensor is disposed in the holder.

7. The optical device according to claim 6,
wherein the sensor is disposed in a position separate from the first axis by a distance greater than or equal to half a length of the second edge and separate from the second axis by a distance greater than or equal to half a length of the first edge.

8. The optical device according to claim 6,
wherein the sensor is disposed in a position where a distance from the first axis in a direction along the second axis is equal to a distance from the second axis in a direction along the first axis.

9. The optical device according to claim 6,
wherein the sensor is disposed at the first corner.

10. The optical device according to claim 6,
wherein the first actuator includes a first magnet provided in the movable section and a first coil to which a current according to the first drive signal is supplied,
the second actuator includes a second magnet provided in the movable section and a second coil to which a current according to the second drive signal is supplied, and
the sensor is a magnetism sensor including a Hall device and is disposed in a position where the sensor does not overlap with the first or second actuator in the plan view.

11. A projector comprising the optical device according to claim 1.

12. A method for controlling an optical device including a movable section including an optical section that has a light incident surface on which video light is incident, deflects the video light in accordance with an angle of incidence of the video light incident on the light incident surface, and outputs the deflected video light and a holder that supports the optical section, a first actuator that rotates the movable section around a first axis, and a second actuator that rotates the movable section around a second axis that intersects the first axis, the method comprising:
causing a sensor disposed in a position different from positions on the first and second axes to detect a position of the optical section, and
adjusting a first drive signal that drives the first actuator and a second drive signal that drives the second actuator in accordance with the position of the optical section detected with the sensor.

* * * * *